Dec. 9, 1969 C. G. KALT 3,483,356

THERMAL PRINTING HEAD

Filed June 27, 1968

United States Patent Office 3,483,356
Patented Dec. 9, 1969

3,483,356

THERMAL PRINTING HEAD

Charles G. Kalt, Williamstown, Mass., assignor to Sprague Electric Company, North Adams, Mass., a corporation of Massachusetts Filed June 27, 1968, Ser. No. 740,748
Int. Cl. H05b 1/00, 3/00; G01d 15/10
U.S. Cl. 219—216 10 Claims

ABSTRACT OF THE DISCLOSURE

Common and individual connections are provided at opposing ends of an array of thermal strips with additional common and individual connections alternated along the strips. The additional commons overlie the strips and extend to the sides of the array whereas the additional individual connections are buried beneath the array and extend beyond its ends.

BACKGROUND OF THE INVENTION

The present invention relates to printing heads for thermally printing alpha-numerical characters on thermally sensitive material and more particularly to a laminated planar thermal printing head having a minimum number of input leads.

In the prior art, printing heads which utilize a stack of wafer substrates having edge mounted heating elements are generally preferred because of their advantageous lead arrangement on the planar surfaces of each wafer. This arrangement, however, requires construction of a large number of component parts and makes an expensive bulky head. Planar construction, on the other hand, which lends itself to batch type assembly techniques and provides a compact unitary structure, is generally avoided because of the lateral separation of elements provided for the leads or because of the large number of leads which feed through the substrate.

It is an object of this invention to provide an inexpensive planar thermal printing head.

It is another object of this invention to provide a laminated thermal printing head having a reduced number of leads.

It is a further object of this invention to provide a thermal printing array having parallel electrically controlled thermal element strips with at least one common connection extended across the strips.

It is a still further object of this invention to provide an array of thermal strips having overlying common connections alternated with underlying individual connections of the thermal strips.

These and other objects of the invention will be apparent from the following specification and claims taken in conjunction with the drawing.

SUMMARY OF THE INVENTION

Broadly, a printing head provided in accordance with the invention comprises a plurality of electrically energizable thermal elements arranged in spaced relation overlying a major surface of an insulative substrate, and at least one common connection member being disposed across said elements between individual connections thereto.

In a limited sense, a printing head provided in accordance with the invention comprises a substrate having an insulative surface, a plurality of lower individual conductors disposed on said surface, an insulative layer overlying a portion of said lower conductors, vertical conductive means extended from said lower conductors through said layer to the upper surface thereof, a plurality of electrically energizable thermal strips disposed in a spaced parallel array on said layer, each of said thermal strips being in contact with a vertical conductive means of two of said lower conductors, a coplanar common conductor deposited on said layer in contact with one end of said strips, a plurality of coplanar individual conductors disposed on said layer at the other end of said strips, each of said coplanar individual conductors in contact with said other end of each strip, and a pair of overlying common conductors disposed over said strips in contact therewith at a point between the connections of each strip to said individual conductors.

DESCRIPTION OF THE PREFERRED EMBODIMENTS

Figure 1:
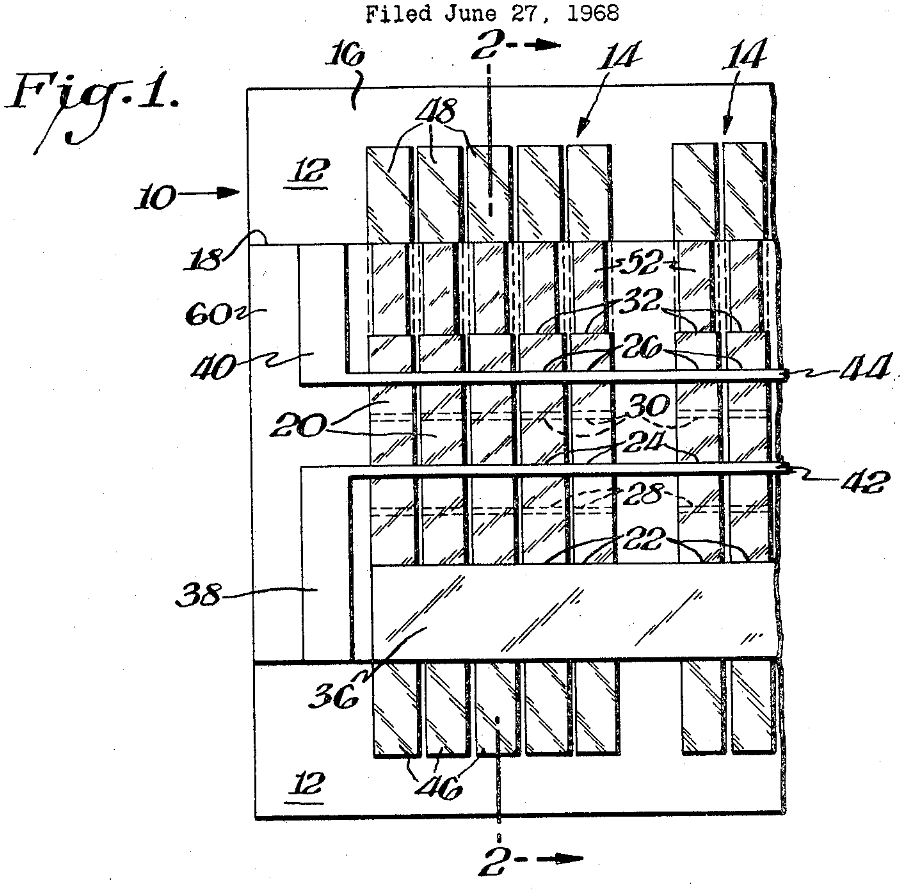
FIGURE 1 is a plan view of a thermal printing head illustrating construction of the unit prior to deposition of a protective overglaze.
Figure 2:
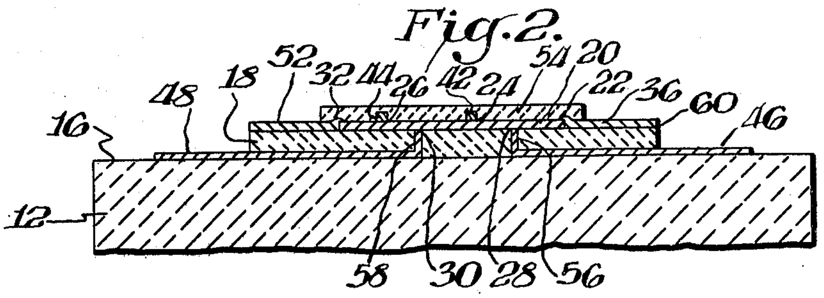
FIGURE 2 is a cross-sectional view taken along the line 2—2 of FIGURE 1, and including a final overglaze.

FIGURES 1 and 2 illustrate a printing head 10 which is designed in accordance with the preferred embodiment of the invention for high speed printing of a line of alphanumerical characters. Head 10 comprises a substrate 12 which carries a plurality of printing arrays 14 on one of its major planar surfaces 16.

In this embodiment, the arrays are arranged in a line on substrate 12. Each array is designed to print one character of a line of print, and since each array is substantially identical to the next the following description of one array is typical of any of head 10.

In a preferred embodiment, each array 14 is constructed with five thermal elements or strips 20 disposed in spaced parallel relation in a side by side coplanar arrangement on an insulative layer 18 which overlies substrate 12. Each strip 20 is contacted by six connecting members so as to provide five electrically controllable segments per strip and twenty-five segments per array. These segments are provided by three equally spaced common connections 22, 24 and 26 which are alternated with rows of equally spaced individual connections 28, 30 and 32.

Common connection 22 is provided by contact to one end of strips 20 by a common conductive member 36 which is substantially coplanar with strips 20 and transverse to them. The remaining two common connections 24 and 26 are provided by conductive members 38, 40, respectively. These are disposed alongside array 14, with narrow conductive common members 42, 44 extended over the array so as to contact each strip 20.

A plurality of lower conductive members 46, 48 extend beneath layer 18 and each end of array 14 to contact strips 20 from beneath and provide individual connections 28 and 30 respectively. Connection to array 14 is completed by a plurality of conductive members 52 which are disposed on layer 18 in contact with the other end of each strip 20.

The alternating common and individual connections of the head provide a plurality of electrically and thermally controllable segments with a minimum number of leads. Thus, array 14 includes twenty-five segments controllable with 18 leads as compared to the twenty-six to thirty leads generally required in the prior art. In addition, the novel lead arrangement also permits minimum spacing between the thermal segments.

In the preferred embodiment, array 14 utilizes the sandwich arrangement disclosed in United States patent application S.N. 611,151 filed in the name of T. W.

Johnson et al. on Jan. 23, 1967. Hence, thermal element strips 20 are sandwiched between electrically insulative layers whose thermal conductivity or thickness is controlled to provide a high front to back thermal ratio.

This construction is illustrated in FIGURE 2 wherein a thin electrically insulative layer 54 is shown covering array 14 so that elements 20 are sandwiched between insulative layers 18 and 54. Layer 18 also serves to insulate the lower conductors 46, 48 from the overlying elements while still providing a substantially planar structure where all external connection points are exposed on one side of substance 12.

Except for modifications necessitated by the particular geometry of the present structure, the materials and processes such as deposition techniques and firing are identical to those described in the aforementioned patent application. Hence, in the preferred process the unit is constructed by depositing and firing conductive strips 46, 48 of platinum-gold alloy or the like on a major surface 16 of substrate 12. Conductors 46 and 48 may be formed as separate individual strips on surface 16 or as a single large sheet which is then cut to provide opposing groups of individual strips. These conductors are typically .001″ thick, .010″–.015″ in width and are separated from each other by .001″ to .003″. Substrate 12 may be any suitable support material, however, a high temperature ceramic such as alumina, beryllia or vitrified glass is preferred since its electrically insulative properties requires no dielectric coating as would be the case with a conductive substrate of metal or the like.

An electrically insulative glaze 18 of glass or the like is then deposited over opposed end portions of conductors 46 and 48 with a short amount of each conductor extended beyond the edges of the layer. Openings are provided at selected points in layer 18 to permit construction of vertical conductors 56 and 58 which connect the covered ends of conductors 46 and 48, respectively, to the upper surface 60 of layer 18. Layer 18 may be deposited in one or several coats with portions of the vertical conductors built up after each deposit or upon completion of the layer. It should be understood that illustrated proportions are not exact since for correct proportionality, the thickness would be approximately 1/25 of that shown. Consequently layer 18 is thin in the order of .001″ to .004″ and vertical conductors 56, 58 are very short.

Once vertical conductors 56 and 58 are completed, thin film resistive strips of platinum, gold and rhodium alloys or the like are deposited on this surface 60 in an appropriate pattern, such as in groups of five parallel strips as illustrated in FIGURE 1. Strips .010″–.015″ wide, .125″ long and 500 angstroms thick are suitable. These may also be applied in separate strips or as a single sheet which is then cut into strip widths. A separation of .001″–.003″ is provided between strips and in each resistor is applied so that it is connected on its underside, at points 28 and 30, to vertical conductors 56 and 58.

In the next step, coplanar conductors 36, 38, 40 and 52 are deposited on surface 60 simultaneously with conductors 42, 44 which overlie array 14. These conductors may be constructed in a manner similar to lower conductors 46 and 48. In this regard each is a .001″ thick strip of platinum-gold alloy. Conductors 38, 40 and 52 are made approximately the same width as the lower conductors while conductors 36, 42 and 44 are extended for at least the width of array 14, that is at least .060″. Conductors 42 and 44 are made quite narrow, for example in the order of .003″, so as to minimize the separation between printing segments. Conductors 36 and 52 are deposited on opposing ends of the array in contact with ends of strips 20 whereas conductors 38, 40 are formed alongside the array with members 42, 44 in contact with each thermal strip. Finally, a thin insulative layer 54 of glass or the like is deposited over the array to complete the structure.

Figure 3:
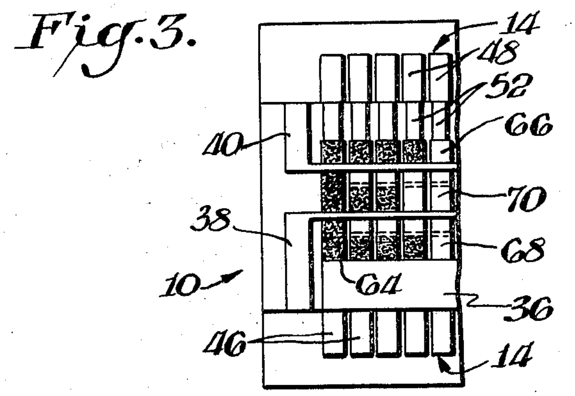
FIGURE 3 is a plan view of the printing head of FIGURE 1 illustrating heating of particular segments for printing of the letter E.

As in conventional thermal printing heads the array is operated by applying a suitable voltage across selected segments (between various connections) to heat them. An illustrative example of the head, wherein selected segments have been energized to form a letter E is shown in FIGURE 3. Herein, all segments of the left hand strip 64 are energized along with three adjoining segments of both the top and bottom rows 66, 68 and two adjoining segments of the middle row 70.

It should be noted, that since some segments of the array have a common connection, for example segments on either side of transverse conductors 42 and 44, portions of the array must be sequentially energized by a commutation of the common conductors or the like. Hence, several printing modes are possible. Each common conductor may be successively commutated for example, conductors 36, 42 and 44 may be successively connected and disconnected to a common voltage (or ground voltage) of head 10 by a rotating commutator or by other mechanical or electronic switching arrangements.

Additionally, any two non-adjacent common conductors, for example conductors 36 and 44 may be commutated against the interposed common conductor 42 by the means described above. For example, in a first step conductors 36 and 44 may be connected to separate voltage grounds of isolated supplies. The thermal strip segments contacting these commons are energized by applying appropriate voltage to individual conductors in accordance with the character desired. Next, commons 36, 44 are opened and the interposed common 42 is grounded to its supply. Then the printing of the character is completed by energizing selected segments, for example, by completing the circuit to particular lower conductors which contact segments bordering on conductor 42.

It should be noted that the jointly fired common conductors must be electrically isolated from one another (by connection to different power supplies) if extraneous heating (current leakage through other than the selected segments) is to be avoided. That is, if these conductors are connected in common to one supply the heating current can also flow past the interposed common (which is open in this case) to a distant individual connection or the next adjacent common. This can be used to advantage, since the leakage current is spread over at least two segments it will provide low heating which can be used for preheating of segments prior to their use in the next portion of the print cycle.

The amount of preheating can also be reduced or controlled by commutating the commons between two discrete voltage points, for example between ground and the energizing voltage of the segments (rather than ground to open) so that the leakage current can never flow past an adjacent common which is now at a specific voltage.

For example, if satisfactory printing is obtained by energizing at 10 volts per segment, the commons may be alternately switched from zero (that is ground voltage) to 10 volts, and selected segments adjoining the zero voltage common can then be energized by applying 10 volts to individual connectors. Additionally, the commons may be switched between ±5 volts with energizing of selected segments by applying either −5 or +5 volts to particular individual connections. In each of these cases, the preheating leakage only occurs prior to energizing of the segment and not during actual printing.

Many different materials can be employed of course and various forms of the inventive unit may be useful. For example, the common conductors may be extended over one or more arrays of the same head as shown in FIGURE 1, or may be separately provided for each array. The number of connecting rows and the spacing between them can also vary, however, in each case common connections and individual connections should be alternated over the length of thermal strip.

The surface arrangement of the thermal elements and conductors may also vary. For example the array need not be orthogonal as shown, but may have connecting rows at other than a right angle to the length of the thermal strips. Moreover, the lower connections may need not be parallel to the overlying elements. Moreover, common conductors need not overlie the heating elements, in all cases, but may be coplanar or underlying the thermal strips. Similarly, many of the individual connections could be provided on the upper surface with connecting conductors brought out between thermal strips or the like.

Thus many different modifications of the invention are possible without departing from the spirit and scope thereof, and it should be understood that the invention is not to be limited except as in the appended claims.

What is claimed is:

1. A printing head for thermally printing alpha-numerical characters on thermally sensitive material comprising a substrate having a plurality of electrically energizable thermal strips overlying a major surface of said substrate and arranged in a spaced array thereon, a pair of individual connection members spaced apart in contact with each of said strips, and a common connection member disposed across said array in connection with each of said strips between said individual connection members.

2. The printing head of claim 1 having a plurality of common connection members disposed in rows across said array with rows of individual connection members being alternated with said common members.

3. The printing head of claim 2 including a plurality of said arrays disposed in side by side arrangement with said common members contacting strips of each of said arrays.

4. The printing head of claim 2 wherein at least one of said common members is a thin narrow conductive strip overlying said array in contact with said elements.

5. The printing head of claim 2 wherein at least one row of said individual members contacts the underside of said elements.

6. The printing head of claim 2 including a plurality of lower individual connection members overlying said substrate surface, a first insulative layer overlying a portion of said lower members, vertical conductive means extending from said lower members to the upper surface of said layer, and said thermal strips being disposed over said layer with each of said strips in contact with at least one of said vertical conductive means, a plurality of coplanar connection members disposed on said layer at one end of said strips in contact with an adjacent end thereof, and a first common member disposed over said strips and contacting each at a point between said coplanar members and said lower members.

7. The printing head of claim 6 wherein said lower members are arranged in two groups spaced from each other with an end of each member of one group aligned with an end of a member of the other group, and said first layer overlies the aligned ends of said lower members with portions of said lower members extending from beneath said layer, and each of said vertical conductive means is in connection to each of said aligned ends respectively, said thermal strips being disposed on said first layer in contact with a vertical conductive means of one member of each group, a second common member overlying and in contact with said strips at a point between their connection to said vertical means, and a common member disposed on said first layer at the other end of said strips in common contact with the adjacent ends thereof.

8. The printing head of claim 2 wherein said common members are electrically commutated for providing sequential energization of strip segments.

9. The printing head of claim 8 wherein every other common member is jointly commutated.

10. The printing head of claim 9 wherein every other of said jointly commutated members is commutated to a voltage supply which is isolated from interposed jointly commutated members.

References Cited

UNITED STATES PATENTS

| | | | |
|---|---|---|---|
| 3,145,071 | 8/1964 | Vance | 346—76 |
| 3,161,457 | 12/1964 | Schroeder | 346—76 |
| 3,312,979 | 4/1967 | Della Torre et al. | 346—76 |
| 3,323,241 | 6/1967 | Blair et al. | |

JOSEPH V. TRUHE, Primary Examiner

P. W. GOWDEY, Assistant Examiner

U.S. Cl. X.R.

346—76